Dec. 13, 1966  D. M. GOODMAN  3,290,941
ELECTRON DISCHARGE DEVICES WITH AUTOMATIC
TEMPERATURE CONTROL
Filed May 21, 1963
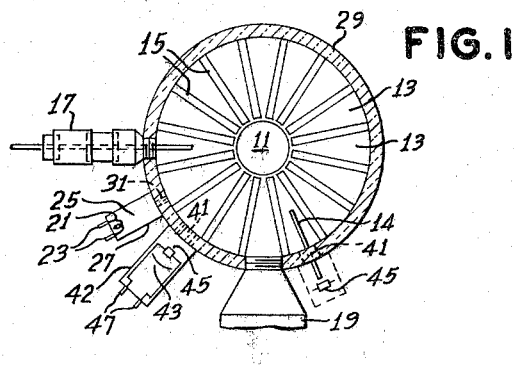
FIG. 1
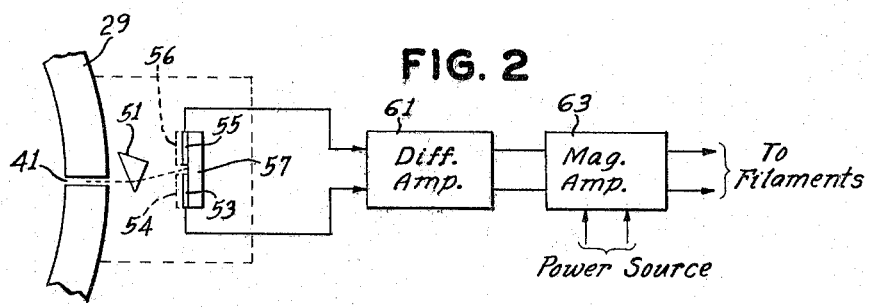
FIG. 2
FIG. 3  FIG. 4  FIG. 5
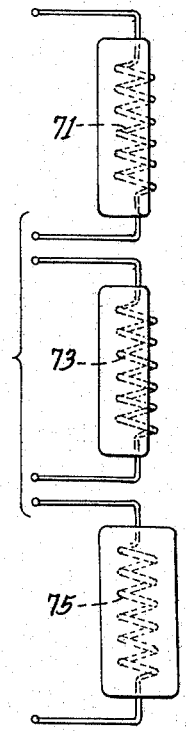
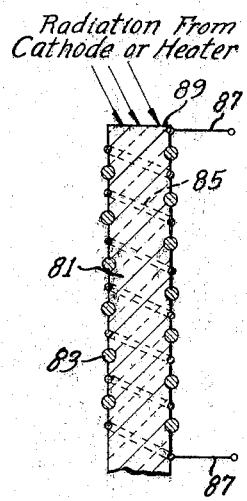
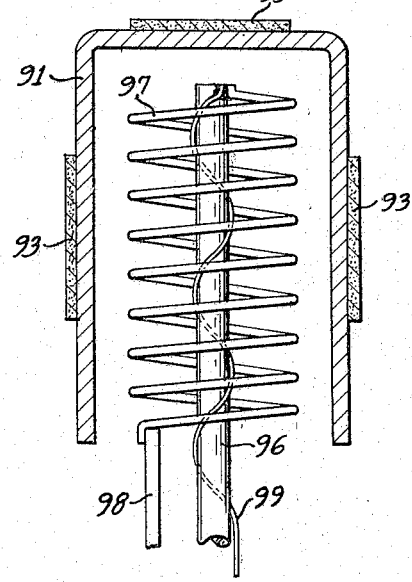
INVENTOR.
DAVID M. GOODMAN
BY 
ATTORNEY

United States Patent Office 3,290,941
Patented Dec. 13, 1966

3,290,941
**ELECTRON DISCHARGE DEVICES WITH AUTO-
MATIC TEMPERATURE CONTROL**
David M. Goodman, 3843 Debra Court, Seaford, N.Y.
Filed May 21, 1963, Ser. No. 282,027
5 Claims. (Cl. 73—355)

This invention relates to methods and means for continuously and automatically controlling the temperature of the electron-emitting cathode in high power electron discharge devices. It also relates to the testing of these tubes. This invention is a continuation-in-part of my co-pending application Serial No. 727,969 filed April 11, 1958 now U.S. Patent 3,092,755 issued on June 4, 1963.

With respect to the testing of high power vacuum tubes for gas content there have been two accepted techniques. In one technique, high voltage is applied to the tube and an "arc counter" is used to determine the rate at which the tube breaks down. This count is taken to be a measure of gasiness. Another accepted technique employs a source of filament current which is impressed upon the heater of the tube. A voltmeter placed across the heater terminals is used to indicate the rate of change in the resistance of the heater. Experience has shown that on some high power tubes the chemical action, between the gas in the tube and the heater element, produces a significant effect on this rate of change of resistance. Both of these techniques are indirect and require a substantial amount of test equipment because either high voltages or high currents are required.

A third technique which has been used employs a Tesla Coil for a vacuum leak indicator, but the high voltage produced by the coil is capable of cracking and destroying good tubes and therefore this technique is not used to any great extent. More recently, the getter-ion pump has been used for cleaning up gases in vacuum tubes and for measuring the degree of vacuum. Although the getter-ion pump arrangement is proving to have considerable value it nevertheless has the disadvantage of requiring high voltages for its operation.

Recognizing that the vacuum may be deficient in these types of tubes, automatic run-up circuits have been used which gradually increase the supply voltage to the tube until arcing occurs at a given rate. Suitable automatic control circuits are then used to reduce the applied voltage in order to reduce the number of arcs, whereupon the plate voltage is again increased. Frequently, these arc counters and automatic run-up circuits have been used to "age-in" magnetrons. This practise has been resorted to when it was felt that the residual gas in the tube could be cleaned up, or absorbed, by the various components in the tube as a result of operating the tube. The getter-ion pump now can provide this same function.

Other automatic high voltage run-up circuits which have been employed use a current sensing device as the control element for the automatic circuits in order to maintain constant the anode current. The average anode current serves as an indicator of the power being supplied to the magnetron, and is responsive to arcing in the tube. In operation, the average anode current of the magnetron may be monitored and controlled not only for arc counting but for purposes of insuring frequency stability, power output, etc.

Another practise that has been employed to stabilize the operation of high powered tubes is to use a regulated source of filament current, frequently of 50 amperes magnitude. Also used, but to a lesser extent, is a feedback arrangement to run the heater element at constant resistance. It has also been the practise to regulate the filament voltage, and then to make compensation (by a pre-determined schedule) for the heating of the cathode caused by back bombardment in magnetrons.

The above described presently used techniques, used singularly or in combination, have failed to provide those qualities desired in testing or operating high powered magnetron tubes. This fact is commonly accepted. It is well known within the armed servies, and in the industries supplying and using these tubes. The magnitude of this problem has caused serious concern from an economic viewpoint and from a military operational readiness viewpoint. Recent U.S. Patent 3,063,012 to H. M. Jackson II (filed March 22, 1961 and assigned to the Bell Telephone Laboratories) indicates that this situation still prevails and that spirited controversy continues between the proponents of the high power tube, the system in which it is used, and the maintenance technician in trying to determine the specific cause of magnetron failure in many radar systems.

Accordingly, it is an object of this invention to provide a device, economical in cost and in power requirements, which is built into a magnetron, or similarly related high power vacuum tube, which makes it possible to determine with a high degree of certainty whether the tube has lost its vacuum.

This objective is achieved by providing high powered electron tubes with a supplementary heater that may be operated at low voltages and low currents. This heater may be similar to those used in ordinary receiving tubes. It is well known that these heater elements will be destroyed when energized with a few watts of power if the tube has gone to air. Hence, once this supplementary heater element is provided within the tube, an elementary test is all that is required to check for loss of vacuum. This makes it practical to cull those tubes which obviously would be non-operable. This may be done periodically in the factory or depot, and again before the tube is installed in the equipment. After the tube is installed, the current drawn by the supplementary filament may be continuously monitored so that when the tube fails, by going to air, an instanteous failure signal is provided.

With respect to the main feature of this invention, controlling the cathode temperature of high power tubes, there is no generally accepted technique which satisfactorily takes into account the effects of back bombardment in magnetrons. Likewise there is no suitable technique for taking into consideration the factors of arcing to the cathode, of emission cooling, and of wide ranges in ambient temperature which effects all types of tubes. It is surprising, in a way, that this condition prevails since the sensitivity of the cathode to temperature is well known.

Accordingly, it is a primary object of this invention to provide novel and useful methods and means for automatically controlling the temperature of electron-emitting cathodes.

This primary objective is achieved by making use of the "color temperature" of the cathode. Means are provided, as part of the tube, to pick up and transmit a portion of the radiation emitted by the cathode of the tube. Use is then made of techniques employed in conventional radiation pyrometers and optical pyrometers. In general, the radiation pyrometer is sensitive to the total radiation; it is a broad band detector. The optical pyrometer is sensitive to monochromatic radiation; it is a narrow band detector. In the radiation pyrometer a thermistor, thermopile, or thermocouple may be used. In the optical pyrometer a method of color matching is used. That these techniques are workable is well known for in factory tests on the cathodes of high power tubes, or in the research and development of these tubes, it is customary to check the cathode temperature by means of an optical pyrometer. It is often the practice to attempt to hold the cathode temperature within ±50° C. of the selected operating temperature. This invention advances the art in that the transmission of the temperature indicating radiation is achieved by providing a thin light pipe as an integral part of the tube; thereby making it practical to include a radiation detector in a suitable feedback system that automatically maintains the cathode temperature within prescribed limits when the tube is in operation.

Besides rapid loss-of-vacuum indication and automatic cathode temperature control in vacuum tubes, still another feature desired today in operative electronic systems is the ability to predict failures before they occur. The advantage of such a feature is clear for it will permit proper scheduling of maintenance activities. This is particularly desirable in high power tubes since they generally have a limited life and because they take many hours to install and adjust. It will be shown that this invention inherently provides such failure prediction information.

The novel features which are characteristic of the invention both as to its organization and method of operation, together with further objects and advantages thereof, will be better understood from the following description considered in connection with the accompanying drawing. In the drawing:

FIGURE 1 is a cross sectional view of an LCW magnetron. The complete description of this tube may be found on page 743 of "Microwave Magnetrons," edited by George B. E. Collins, vol. 6 of the Radiation Laboratory series published by McGraw-Hill Co., 1948.

FIGURE 2 contains the block diagram of the cathode filament control circuits and illustrates the photo-conductive, or otherwise photo-sensitive, split element that is impinged upon by the radiation from the cathode.

FIGURE 3 illustrates a plurality of supplementary heaters that may be used to raise getters to different temperatures.

FIGURE 3 illustrates a plurality of supplementary heaters that may be used to raise getters to different temperatures.

FIGURE 4 illustrates a light pipe member for transmitting radiation from the cathode.

FIGURE 5 illustrates a cathode element with a filament type heater. The light pipe transmits radiation from the back side of the cathode element.

In FIGURE 1, a magnetron is shown having a cathode 11 which is to be heated. The heater element is not illustrated. A series of resonant chambers 13 are formed by vanes 15, the cathode 11, and the wall 29 surrounding the vanes. A magnetic field is supplied parallel to the longitudinal axis of the cathode of the tube. Oscillations are obtained when a pulsed uni-directional voltage is applied between the vanes 15 and the cathode 11, in the presence of a suitable magnetic field. The cathode pipe is shown at 17 and the output pipe is indicated at 19. The manner in which a coupling loop extends outward from the pipe 19 into the cavity is not shown nor are the heater connections shown as they are not necessary for a proper understanding of this invention.

Supplementary fuse element 21 comprises a heater filament, the leads of which are brought out through pins 23 in such a manner as to preserve the vacuum in chamber 25. Housing 27 is affixed to the wall 29 of the cavity structure by welding or soldering, in a manner similar to that used for sealing pipe 17 or 19 to the structure. A small opening 31 connects chamber 25 with the evacuated resonant chambers 13 of the magnetron tube. Opening 31 may be very small in size so as to shield chamber 25 from the RF currents in the main cavity. It is clear that when the evacuated cavity of the magnetron loses its vacuum that the same happens to chamber 25. Under these conditions the energization of filament 21 causes it to rupture. The filament 21 is energized by impressing a low voltage and low power source to terminals 23. When the filament ruptures it results in an open circuit and there obtains a positive, immediate indication that—due to loss of vacuum—the entire magnetron tube is inoperable.

By way of illustrative example, the filament 21 may be the same as that utilized in the heater of a 6AU6 vacuum tube. It is well known that filaments of receiving tubes of this type will be affected by any substantial air content within the tube, and that the filament will disintegrate upon application to it of normal rated power. The heater in this receiving type tube operates at 6.3 volts and draws 300 milliamperes thereby consuming approximately 2 watts of power. Clearly, it its only necessary to measure, or monitor, the current in the filament 21 since loss of this filament current generally will indicate the loss of vacuum within the tube. Thus, with a simple 2 watt source of power and a simple indicating meter, it is possible to cull those high power tubes the vacuums of which have gone to air. This culling procedure may be employed in the factory, at the depot, or in the field. This test may also be performed on the tube just prior to installation. After installation, this same test filament may be used to provide a continuous indication of the presence of vacuum in the tube.

It is clearly desirable that the hours of life to be provided by filament 21 should be considerably in excess of that expected of the high power tube in which it is located. This condition is readily achieved. Nevertheless, it may also be desirable to provide a plurality of these loss-of-vacuum indicators in order to insure that a high power tube will not be rejected on the basis of a faulty vacuum indication. Thus, in FIGURE 3 a plurality of test filaments are shown.

In the event that more accurate vacuum indication is required, as may be the case when the tubes are returned to the depot or factory for retest, then filament 21 may be designed to be a Pirani Gage element. Alternatively the housing 27 may comprise, in addition to the heater element, an electron-emitting cathode and a collector plate; or an ionization gauge. Reference is made to techniques for alternative embodiments of vacuum gauging devices on pages 77–79 of Photo-Electricity, by Zworykin and Ramberg, published by J. Wiley and Sons, 1949. Reference is also made to U.S. Patent 2,824,246. The fundamental considerations are that the housing containing the vacuum indicator should be permanently vacuum sealed to the tube; the elements comprising the vacuum indicator should be removed from the RF field; and connections between the tube and the indicator chamber should provide for passage of the "atmosphere" therebetween.

Also shown in FIGURE 1 is a housing 42 attached to the body of the magnetron. Contained therein is a thermistor 45, a parabolic reflector 43, and pins 47 which are electrically connected to thermistor 45. Part of the radiation from cathode 11 is transmitted through passage 41 to be focused by reflector 43 upon the radiation sensitive thermistor. Under normal operating conditions the resistance of the thermistor reaches a stable value depending upon the temperature thereof, which in turn is effected by the amount of radiation which impinges upon it from the cathode. This resistance element may then become one arm of a Wheatstone bridge which may be used as a control circuit that regulates the amount of power delivered to the heater of the magnetron. This regulation may be accomplished in many ways using conventional control circuitry, e.g., as in bolometer bridges. The result is that the variations in the temperature of the cathode normally experienced in magnetron operation are reduced substantially. This feature of the invention stabilizes the operation of the tube (1) by tending to maintain a constant electron emission from the cathode, and (2) by reducing changes in the dimensions of the frequency determining elements that occur due to thermal expansion and contraction. This temperature stabilization also reduces the stresses and strains to which the cathode and the heater are subjected, helping still further to provide a greater life expectancy for the tube.

When passage 41 comprises a physical opening in the wall structure 29 then clearly housing 42 should be vacuum sealed to 29 as was described for housing 27. Alternatively, it is possible to have other arrangements whereby sector 41 comprises a radiation transmitting element, such as a lens, which is vacuum sealed to structure 29. In these cases housing 42 need not be vacuum sealed to the magnetron. It is also possible to pick up the radiation from the cathode 11, or from the filament 21, and to transmit these radiations to a situs external of the tube where they may be utilized as set forth in this specification. Radiation transmitting means 14 may comprise a rod of fused silica. The rod may be arranged as illustrated in the drawing; or it may be embodied in a vane; or it may be combined with the assembly of cathode 11 or heater 21. Arrangements of light pipe means 14 that may be used, and advantages derived therefrom, are described in my copending application Serial No. 119,221 filed June 23, 1961 and in my U.S. Patent 2,915,659.

In FIGURE 2 another arrangement is shown for detecting and utilizing the radiation from cathode 11. Generally speaking this arrangement uses two color pyrometry which is different from the arrangement of FIG. 1 which may be said to use broad-band pyrometry. A portion of the wall structure 29 is shown with an opening 41 similar to that described with relation to the operation of FIGURE 1. The opening 41 may constitute or comprise collimating means. A prism 51 is used to disperse the radiation emitted by the cathode which is transmitted to impinge upon detector 57. Detector 57 is comprised of elements 53 and 55 which are adjacent but separated from each other. The elements are photo-conductive, photo-voltaic, or otherwise photo-sensitive. The electrical connections to detector 57 and the associated circuits depend upon the specific nature of the detector element and therefore are represented here in schematic but symbolic form. Reference is made to U.S. Patent 2,616,283 for a more complete description of a detector which may be used in this case.

It is desirable, as stated heretofore, that during normal operation of the tube that the cathode be maintained at a prescribed temperature. Detector 57 is disposed with relation to prism 51, opening 41, and cathode 11 so that when the prescribed temperature is reached the total radiation impinging upon element 53 is equal to that impinging upon element 55. Under this condtiion the electrical signals from elements 53 and 55 are equal. When the temperature of cathode 11 changes the distribution of radiation emitted also changes. This change, of the amplitude vs. wavelength curve, accurs in accordance with Wien's Displacement Law. Due to the dispersion of the prism the radiation impinging upon elements 53 and 55 then becomes unequal. The differential output between elements 53 and 55 is then amplified in 61. The output of 61 is connected to the control windings of magnetic amplifier, or saturable reactor, 63. The input to 63 is from a primary power source; the output of 63 supplies the thus-controlled power to the filaments that heat cathode 11.

The heating of the cathode in a magnetron is a function of the power supplied to the filament, the magnitude and distribution of the D.C. and A.C. currents, and the back bombardment. When the filament is first energized the magnetic amplifier is at a set "gain." Normally this will be set to limit the inrush of current to the cold heater filaments. The power supplied to the filaments raises the temperature of the heater and then the cathode. When the prescribed cathode temperature is reached there is a null in the output of amplifier 61. When this temperature is exceeded there is a differential output from detector 57. This in turn reduces the heating of cathode 11 thereby reducing its temperature, and reference is made to U.S. Patent 2,805,385 for additional details of circuits that may be used in this connection. This process of regulation will compensate for variations in the filament power source, in the current heating effects, and in the back bombardment; it will compensate for changes in the filament-cathode heat transfer mechanism; and it will also compensate for changes in ambient temperature. Thereby the desired objective is achieved of reducing temperature variations of the cathode.

At this point a number of alternative embodiments may be considered. Instead of prism 51, or in addition to it, filters may be used on the elements 53 and 55, to regulate the radiation impinging upon said elements. The filters 54 and 56 preferably are narrow band transmission devices. Filter 54 is peaked to one frequency; filter 56 is peaked to a second frequency. Together they straddle the hump of the amplitude-wavelength radiation emission curve of the cathode when operating at its prescribed temperature. Under this condition there is a null in the output of 57. It is clear that this arrangement then produces a differential output from detector 57 when the temperature of the cathode changes.

It is also possible to use the vacuum sensing element as the temperature sensing, or comparing, element. This may be done by utilizing the filament 21 in a manner frequently used in optical pyrometers of the laboratory type. The temperature of filament 21 is controlled by the power fed into it. This temperature is adjusted, colorwise, to match that of the cathode 11 at its prescribed setting. Variations of cathode 11 from its prescribed temperature may be utilized, by means of a control loop, as hereinbefore described, to reduce these temperature variations. Since many techniques for designing servo amplifiers, and optical pyrometers, have long been known there is no need to provide additional elaboration at this time. To illustrate this point, reference is made to Kingsbury Patent 2,302,554 issued Nov. 17, 1942 and to George Patent 3,079,507 issued Feb. 26, 1963.

It is also possible to use the fuse element 21 in conjunction with certain types of getters to clean up emitted gases. The element 21 may be raised to a temperature to heat the getter material to its optimum value. The getter may be coated on 21, on part of 21, or may be located nearby. By way of example, a material Cermalloy 400 produced by New Process Metals, Inc., Newark, New Jersey, may be used. Reference is also made to Hirschorn, et al., Patent 2,890,367 and to Lederer Patent 2,899,257. Thus, in FIGURE 3, three heaters 71, 73 and 75 are illustrated, each of which may be raised to a different temperature. Filaments 71 and 73 are shown to be partially exposed so that they may rupture upon application of the heating current if the tube in which they are located has gone-to-air. As previously suggested, the fuse-like filaments 71 and 73 are preferably connected separately (or in parallel) to their terminals so that if one of the filaments fails prematurely, the other will still provide a loss of vacuum test. In FIGURE 4 a glass light pipe 81 supports a coiled getter wire 83. A heater filament 85 is also coiled around the light pipe 81, and two electrical terminals 87 are shown for energizing the heater filament. The light pipe may be circular or rectangular in cross-section; and it is to be understood that the assembly of FIGURE 4 is provided for insertion into discharge devices in such a manner that the pickup end 89 of the light pipe 81 is positioned to receive radiation from the electron emitting cathode of the device. Heater filament 85 is coiled about the glass light pipe in the region of pick-up end 89, so that the surface temperature of 89 is raised in order to repel ions and other particles which may be emitted by the cathode, or other tube elements. Structures akin to FIGURE 4 may also be used, when suitably placed within the tube, to pick up the visible radiation which occurs when arc discharges take place between tube elements. Mechanical details for winding the filament on the glass member, the physical placement of the light pipes, the arrangements for vacuum sealing the light pipes to the tube housing, etc., are well known to persons skilled in the electron tube art and so are not further described. It will be noticed, however, that the structure of FIGURE 4 provides (1) the supplementary heater for the vacuum test, and (2) the getter material which is heated to its operating temperature by the supplementary heater, and (3) light pipe means for transmitting "visible" radiation.

The structure of FIGURE 5 shows that the fore-going teachings are also applicable to low power or receiving type tubes. Thus, in a typical case, cathode support member 91 may have an electron emitting surface such as cylindrical cathode 93, or such as planar cathode 95. Clearly, thin glass light pipe members can be positioned to view these surfaces. It is also possible, however, to view the cathodes from their rear sides; and it is also possible to position light pipes to view the heater element itself. For these latter purposes glass rod 96 is provided. One end of rod 96 supports the heater winder 97. The electrical connections to the heater are shown at 98 and 99. This arrangement obviously has its greatest advantages when the vacuum tube requires precise regulation of the temperature of the cathode. It also has important advantages for maintenance purposes in that the heater of the tube can be inspected, visually or automatically, to see if it is energized. In ceramic type tubes this feature is of considerable significance since there are no other means for making such inspections.

To describe, additionally, how this invention may profitably be used for maintenance purposes, it is noted that normal distribution of components of this type entails shipment to factories, warehouses, depots, or operational stations. Therefore, many of these vacuum tubes will be stored for a considerable period of time without being used. Unfortunately, the vacuum frequently deteriorates during storage. Hence, under these conditions and with this invention, a test schedule may be set forth that will check the vacuum of the tubes periodically. As hereinbefore described, this test is quite elementary. It requires only a few watts of power, at low currents and voltages. It is capable of being made while the tube is still packaged in the shipping crate. If the tube passes this test, and shows no signs of mechanical damage in shipment, it may be installed with confidence into the prime equipment.

Although details have not been provided, it is likewise clear that it is desirable to test the strength of the magnetic field in those tubes that have integral magnets. Solid state sensors may be used for this purpose. Finally, the desirability of testing the tube at rated voltages, as is often suggested, is not so clear. The nature and extent of this last test should be decided upon after a review of the operational history of each tube type. It is to be realized that to perform these tests at rated operating voltages, requires uncrating (and often repackaging) of the magnetron; requires substantial amounts of high voltage equipment; and provides a test which at best can only simulate the final conditions under which the tube is to operate.

A more suitable arrangement, made possible by this invention, to assist in the proper maintenance of both the tube and the system in which it works is to monitor and control the critical circuits in the prime equipment at all times after the tube is installed. Thus, the condition of vacuum should be monitored continuously. The error (or correction) signal in the cathode temperature regulating loop should be monitored continuously. The magnetron anode current should be automatically regulated and between specified limits. Automatic run-up and run-down circuits, sensitive to visible arc-count and controlling anode current, should be incorporated. Cathode electron emission should be checked. And, consideration should be given to monitoring the video pulse that modulates the tube, monitoring the power output, and monitoring the oil bath temperature when such a bath is used. In this way, a history of behavior of the tube can be obtained not only in the system but in the actual environment in which it works. This history can be brief, or it can be long in duration.

To illustrate these points consider a typical radar system comprising a power supply, a modulator, a power tube, a waveguide section, and a scanning antenna. Due to mismatch, or for other reasons, an excessive voltage occurs in the waveguide and arcing takes place. This arc travels down the guide. It punctures the window of the power tube, and possibly causes other damage in the modulator and power supply. The system is down but the waveguide remains undamaged. Without a proper record of events, it is reasonable to suspect that the window in the tube was defective. Therefore the tube is replaced, and soon again the destructive process is repeated.

On the other hand, to follow the teachings of this invention there is provided a light pipe arc detector in the waveguide, coupled with a supplementary fuse element in the power tube. These two built-in components, taken in combination with elementary circuits which employ simply relay logic, can pin-point this type of fault with ease and certainty. The location of the initial fault, be it in the waveguide or in the tube, is positive and practically instantaneous. Guesswork is eliminated.

In the event that a catastrophic failure such as just described does not occur, but that a slow wearing-out process takes place, it becomes equally desirable to be able to predict future failures. One typical illustration of how this can be done consists simply of pointing to the continuous monitoring of the cathode temperature regulating loop. Whenever the control voltage in this loop goes out of tolerance, there is reason to be alert to imminent failure. The nature of the anticipated failure depends, naturally, on many factors but it is clear that if the tube has already been operating past its normal life expectancy then the tube properly becomes suspect and it is replaced before actual failure occurs.

In conclusion, it should be noted that the teachings of this invention are also applicable to the temperature control of heated surfaces which are intended to yield a copious supply of charged particles, other than electrons, such as may be employed in various ion-propulsion devices.

Having thus described the invention, and the ways in which it may be used to achieve the desired objectives, I claim:

1. A charged particle discharge device comprising: a member for generating the charged particles, first means for heating said member and a dielectric light pipe for transmitting radiation from the said member, in combination with second means for heating said light pipe to prevent material from depositing thereon.

2. An evacuated electron discharge device comprising a cathode and an optical light pipe for transmitting radiation from the cathode in combination with means used primarily for heating said light pipe.

3. The device of claim 2 wherein the means for heating said light pipe is positioned to also heat said cathode to its normal operating temperature.

4. An evacuated electron discharge device comprising a cathode and an optical light pipe for transmitting radiation from the cathode in combination with means coiled about said light pipe for heating said light pipe to prevent material from depositing thereon.

5. A temperature measuring device comprising: a dielectric light pipe having an entrance port capable of being positioned to face a radiation source whose temperature is to be measured, heating means associated with said light pipe to raise the temperature thereof in order to repel foreign deposits that might otherwise impinge upon said entrance port, and means coupled to an exit port of said light pipe responsive to electromagnetic radiation in the range from infrared to ultraviolet for indicating the temperature of the radiation source.

References Cited by the Examiner
UNITED STATES PATENTS

| | | | |
|---|---|---|---|
| 1,970,103 | 8/1934 | Runaldue | 315—151 X |
| 2,262,044 | 11/1941 | Philpott | 328—11 |
| 2,632,846 | 3/1953 | Hornfeck | 328—3 X |

DAVID J. GALVIN, *Primary Examiner.*

GEORGE N. WESTBY, *Examiner.*

D. E. SRAGOW, *Assistant Examiner.*